United States Patent [19]

Heiman

[11] Patent Number: 5,546,817
[45] Date of Patent: Aug. 20, 1996

[54] STEM TORQUE SENSOR

[75] Inventor: Stephen M. Heiman, Exton, Pa.

[73] Assignee: Liberty Technologies, Inc., Conshohocken, Pa.

[21] Appl. No.: 71,560

[22] Filed: Jun. 4, 1993

[51] Int. Cl.$^6$ .................................................. G01M 19/00
[52] U.S. Cl. ........................................ 73/862.333; 73/168
[58] Field of Search ............................. 73/168, 856, 859, 73/847, 862.333, 862.338

[56] References Cited

U.S. PATENT DOCUMENTS

| | | | |
|---|---|---|---|
| 2,566,566 | 9/1951 | Howes | 73/862.333 |
| 2,581,264 | 1/1952 | Levesque et al. | 33/147 |
| 3,184,962 | 5/1965 | Gay | 73/88.5 |
| 3,199,057 | 8/1965 | Gindes et al. | 338/5 |
| 3,228,240 | 1/1966 | Ormond | 73/141 |
| 3,535,937 | 10/1970 | Wiggins et al. | 73/398 |
| 3,603,152 | 9/1971 | Albert et al. | 73/398 R |
| 3,698,248 | 10/1972 | Vasek | 73/398 AR |
| 3,698,249 | 10/1972 | Weaver | 73/398 R |
| 3,742,760 | 7/1973 | Kato | 73/141 A |
| 3,750,475 | 8/1973 | Weaver | 73/398 AR |
| 3,850,030 | 11/1974 | Adler | 73/862.339 |
| 3,866,473 | 2/1975 | Teitelbaum et al. | 73/398 AR |
| 3,898,885 | 8/1975 | Russell | 73/398 AR |
| 3,965,745 | 6/1976 | Carey | 73/398 AR |
| 4,251,918 | 2/1981 | Duggan | 33/148 D |
| 4,290,311 | 9/1981 | Brewer | 73/730 |
| 4,412,456 | 11/1983 | Wilhelm et al. | 73/862.65 |
| 4,425,800 | 1/1984 | Claassen et al. | 73/730 |
| 4,498,336 | 2/1985 | Dalton | 73/168 |
| 4,566,310 | 1/1986 | Cohen et al. | 73/9 |
| 4,570,903 | 2/1986 | Crass | 251/129.12 |
| 4,587,739 | 5/1986 | Holcomb et al. | 33/143 L |
| 4,646,563 | 3/1987 | Jones | 73/119 A |
| 4,706,501 | 11/1987 | Atkinson et al. | 73/730 |
| 4,759,224 | 7/1988 | Charbonneau et al. | 73/862.31 |
| 4,787,245 | 11/1988 | Anderson et al. | 73/168 |
| 4,805,451 | 2/1989 | Leon | 73/168 |
| 4,911,004 | 3/1990 | Leon | 73/168 |
| 5,103,681 | 4/1992 | Duff | 73/862.54 |
| 5,197,338 | 3/1993 | Heiman et al. | 73/862.29 |

FOREIGN PATENT DOCUMENTS

| | | |
|---|---|---|
| 2368692 | 5/1978 | France . |
| 966713 | 8/1964 | United Kingdom . |
| 2116330 | 9/1983 | United Kingdom . |
| 8500652 | 2/1985 | WIPO . |
| 8503121 | 7/1985 | WIPO . |
| 8508491 | 11/1988 | WIPO . |

OTHER PUBLICATIONS

"Get a Better Grip with Frictional shaft Mounts" by Paul Dvorak, *Machines Design*, 1989, 7 pages.
"A Typical HBC Gear Operator", p. 3 , Limotorque Corporation.
"Limitorque Valve Controls" Manual Type HBC, Bulletin 15–73, 1 Sheet, Limitorque Corporation.

*Primary Examiner*—Richard Chilcot
*Assistant Examiner*—R. Biegel
*Attorney, Agent, or Firm*—Panitch Schwarze Jacobs & Nadel, P.C.

[57] ABSTRACT

A strain sensor device is attached to a cylindrical structural member for measuring the amount of twist of the member about an axis of rotation and includes a central beam, which is aligned parallel to the axis of rotation of the structural member and is fastened in between two mounting members which are themselves fixedly secured to the structural member. When torsion occurs in the structural member, the one mounting member will move in a relative direction parallel to the other mounting member but offset by the length of the central beam. The central beam is significantly less rigid than the mounting blocks and bends to accommodate the movement. Four strain gauges are secured to the central beam in a bridge circuit to measure bending of the beam. The bridge circuit generates electrical signals proportional to the angle of twist and the torsional load on the structural member. Additional strain gauges can be provided on a second beam, perpendicular to the central beam, to measure bending of the second beam proportional to axial loads on the structural member. Shaped blocks, which are adhered to the structural member, or clamps may be used as mounting members.

9 Claims, 4 Drawing Sheets

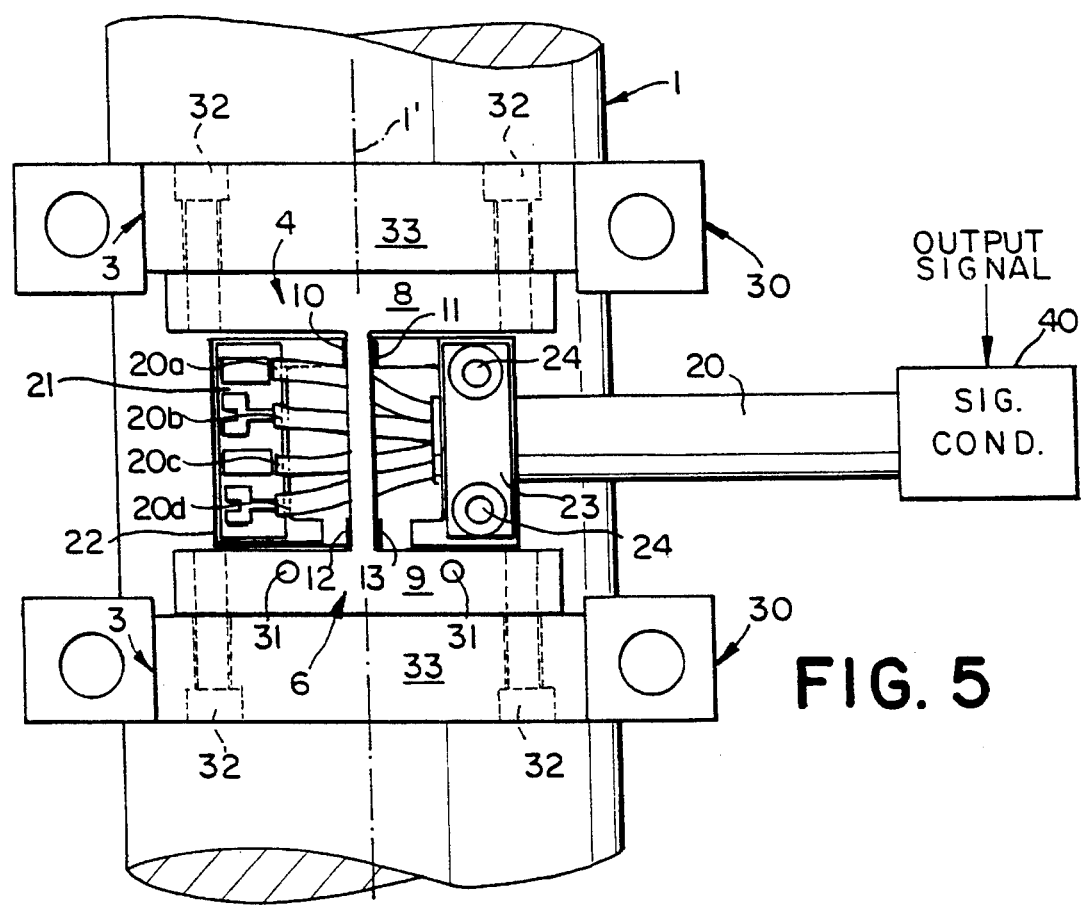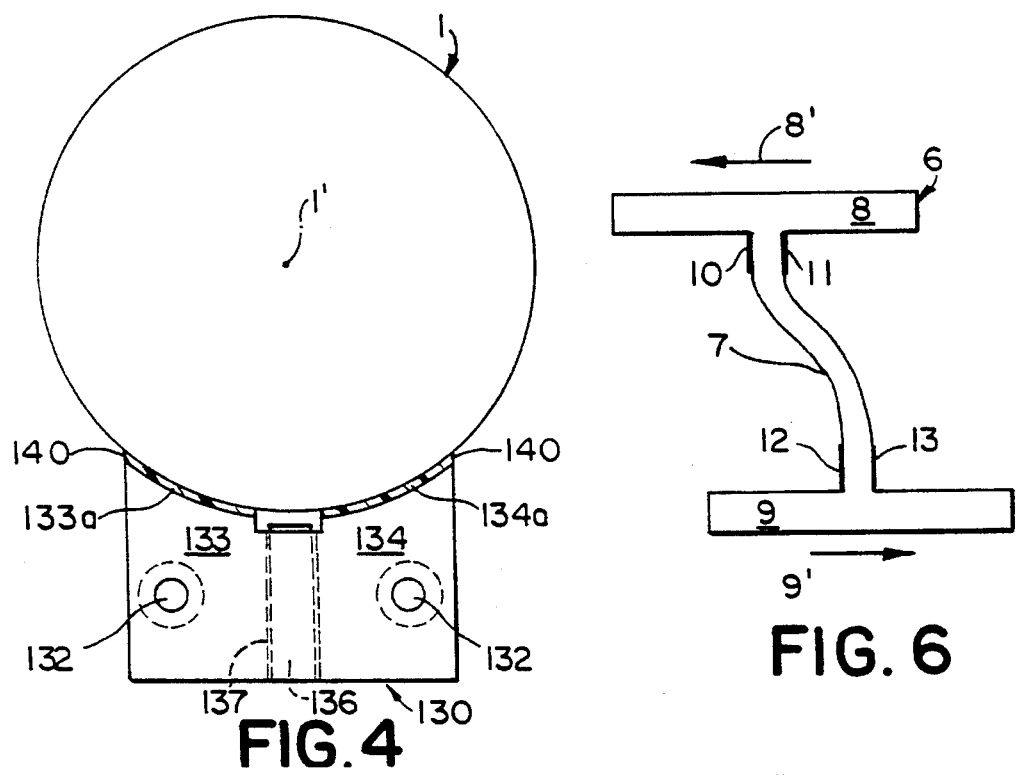

STEM TORQUE SENSOR

FIELD OF THE INVENTION

The present invention relates generally to torque sensors and, more particularly, to a system and method for sensing and measuring the torque in an existing valve stem or other transmission component for which the geometric and material properties are known.

BACKGROUND OF THE INVENTION

Numerous sensor devices are currently available for measuring the torque in either a rotating or fixed shaft or other torque transmission component. Most employ some type of strain gauged bridge mounted directly to the surface of a well defined geometric volume and aligned for maximum output. A typical example of this configuration is a solid circular shaft with four strain gauges aligned at 45° to the axis of rotation.

Such strain gauged shaft sections must have some type of flange or other means for connection to the component in which the torque is to be measured. This is because this type of torque sensor device is designed to operate in series with the load it measures and all the load that normally causes the torque must go through the torque sensor. Because of that requirement, provisions must be made to allow for proper and matching bolt hole locations, keyways, and other sizing requirements in the component in which the torque is to be measured. This requirement can preclude the use of such a torque sensor in many instances. A single and relatively simple drivetrain component such as a 1 inch diameter shaft must be cut and flanged or keyed to allow for the torque sensor. In addition the torque sensor will often have a profile larger than the member it is attached to, which can create interferences with other components.

One technique being employed to overcome the difficulties of the above mentioned strain gauged, cylindrical section torque sensor is to apply strain gauges in a bridge directly to the member in which the torque is to be measured. Then, knowing the characteristics of the strain gauged bridge and gauge factor of the strain gauges, the strain can be determined. The strain is related to torque by geometric and material properties.

The direct mounting of strain gauges on existing operating equipment in field locations can be difficult. Mounting surfaces must be clean and smooth, and alignment of gauges is critical. In addition, curing of the epoxies or other adhesives used in the process can vary.

The main problem with field installation of directly mounted strain gauges is calibration—the measuring and relating of the electrical signal from the strain gauges to a known input covering its range of operation. All of the previously mentioned mounting problems could be tolerated to some extent if the mounted strain gauges could be accurately calibrated in their final state. While all torque sensors are always calibrated with a sensitivity and operating range criteria, it is usually impossible to accurately calibrate field installed strain gauges. Thus, the sensitivity of these gauges will be subject to a wide range of error.

It would be desirable to overcome the problems of prior art systems by providing a torque sensor which is easily calibrated and easily installed in the field on existing equipment without modification or disassembly of the equipment.

SUMMARY OF THE INVENTION

In one aspect, the invention is a system for determining torsional loading on a generally cylindrical member comprising: mounting means for removable attachment to a portion of a cylindrical member surface and for moving in response to torsional deformations in the portion of the cylindrical member; and sensor means connected with the mounting means for sensing rotational movement of the mounting means resulting from torsional deformations in the portion of the cylindrical member and for generating signals proportional to the sensed movement.

In another aspect, the invention is a stem torque sensor device comprising: first and second mounting members, each having an at least generally concave surface for attachment to an outer surface portion of a cylindrical member; and a torsion sensor fixedly coupled with each of the first and second mounting members, between the first and second mounting members, spacing the first and second mounting members apart from one another in an axial direction of the device with the at least generally concave surfaces of the first and second mounting members at least generally coincident in the axial direction so as to permit the concave surfaces to be applied simultaneously to an outer surface portion of a cylindrical member, the torsional sensor being oriented between the mounting members to respond to slight movements of the first and second mounting members with respect to one another resulting from torsional deformations in any cylindrical member to which the mounting members are secured.

In yet another aspect, the invention is a method of measuring torsional strain in a cylindrical member comprising the steps of: immovably affixing to an outer surface of the cylindrical member, first and second mounting members of a sensor device, the mounting members being spaced apart axially from one another on the cylindrical member, the sensor device further including a sensor fixedly secured with each of the first and second mounting members, between the mounting members, the sensor being responsive to slight relative movements of the first and second mounting members with respect to one another; loading the cylindrical member at least across the first and second mounting members; and generating a signal with the sensor proportional to strain on the cylindrical member from the loading step.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed. In the drawings:

FIG. 4 depicts diagrammatically an adhesively secured embodiment of the present invention.

FIG. 5 depicts diagrammatically the strain sensing portion of the preferred embodiment of the present invention.

FIG. 6 depicts diagrammatically the deflection of the main strain member in a strain sensor embodiment of the present invention under a torsional load.

DETAILED DESCRIPTION OF THE PREFERRED EMBODIMENTS

Systems of the present invention are designed to measure strain in a cylindrical member in a way in which the sensing device does not effect nor require any alterations to the member under torsional load so that torsional load may be determined indirectly. The relationships of strain to material and geometric properties of the cylindrical member yield torque. The modular design approach of the present invention uses a standard sensor unit containing a strain gauged member fastened to custom mounting members designed for the diameter of the surface of the cylindrical member being measured.

Figure 1:
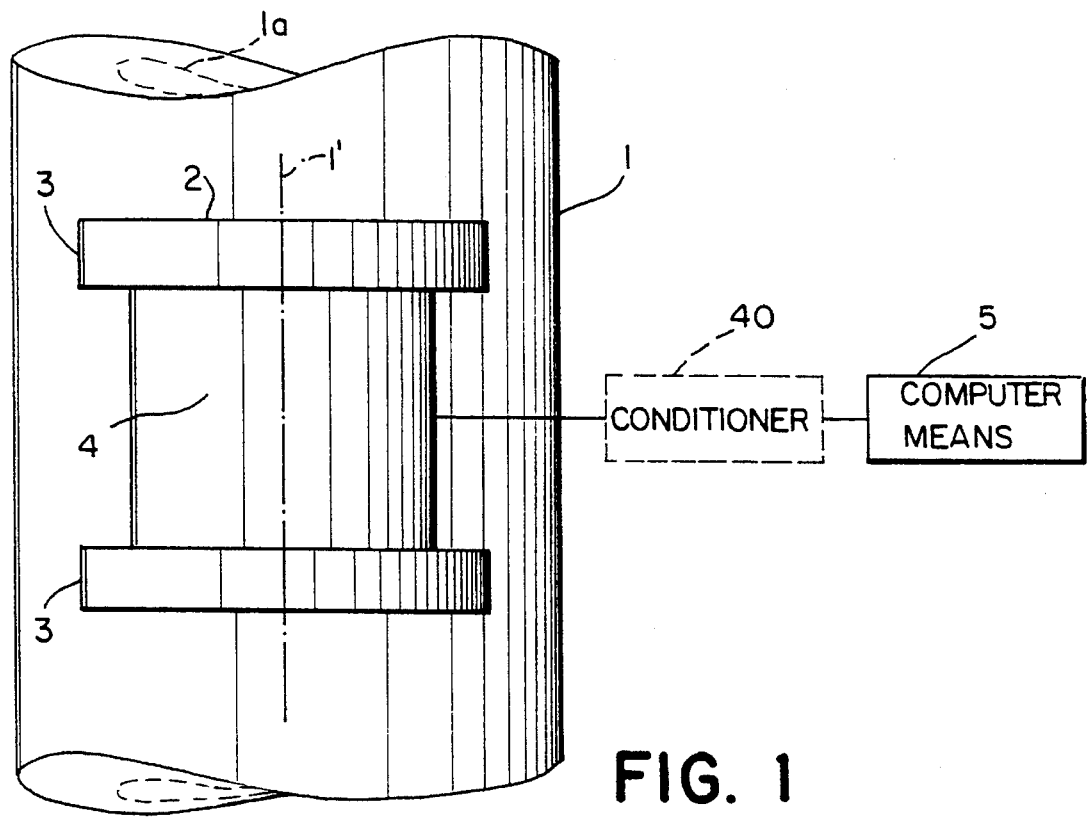
FIG. 1 is a block diagram of the main components of a measuring system of the present invention in relation to a cylindrical member.

FIG. 1 depicts generally a system of the invention for determining (i.e. sensing and measuring) the torsional loading on a load-bearing, generally cylindrical member indicated by 1. The system includes a torsional strain or stem torque sensor device of the present invention indicated generally at 2, used for determining rotational deformations in the cylindrical member 1 which are proportional to its torsional loading. The device 2 includes mounting means in the form of first and second mounting members, collectively identified generally at 3, and sensor means, indicated generally at 4, connected to mounting means 3. The mounting means 3 and sensor means 4 together constitute the torsional strain or stem torque sensing device 2. The preferred system further comprises computer means, indicated generally at 5, which preferably comprises a programmed computer connected with the sensor means 4 of the torsional strain sensor device 2 for receiving data from the sensor device 2 and for determining torsional loading on the cylindrical member 1 from signals generated by the sensor means 4. An intermediate signal conditioner 40 (in phantom) may be desired to condition the signal from device 2 before transmission to the computer means 5. The individual members of the mounting means 3 are adapted for immovable attachment to a portion of the cylindrical member 1 spaced axially along the member 1 from one another and for moving with respect to one another in response to deformations in the portion of the cylindrical member 1 induced by loading on the cylindrical member.

Figure 2:
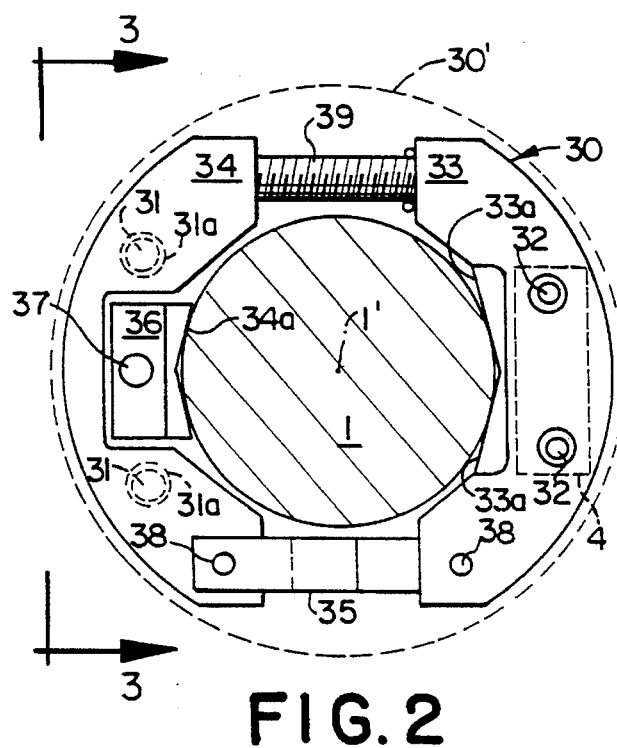
FIG. 2 depicts diagrammatically a clamp securing embodiment of the present invention.
Figure 3:
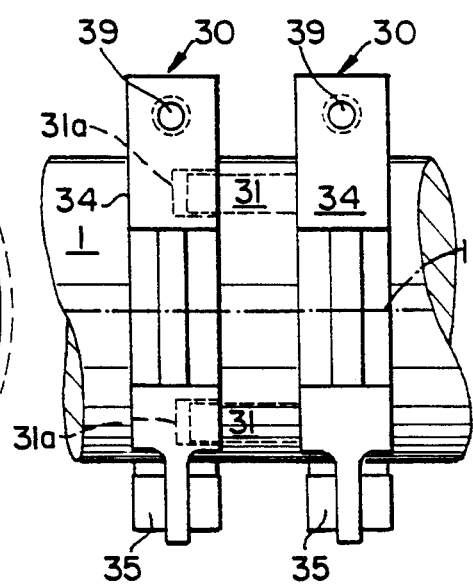
FIG. 3 depicts diagrammatically a pair of clamps of the embodiment of FIG. 2 taken along the lines 3—3 in FIG. 2.

One embodiment of mounting means 3 contains first and second identical clamps 30, one of which is shown in FIG. 2 and a pair of which are shown in FIG. 3 fixedly attached to the cylindrical member 1. Each clamp 30 includes diametrically opposing clamp members or blocks 33 and 34. Clamp member 33 includes a generally concave preferably generally V-shaped clamping surface 33a with an included V angle of between about 60° and about 165° and preferably about 120° to 160°. Clamp member 33 is rigidly secured to the sensor means 4 via mounting screws 32. The device 2 is rigidly secured to the cylindrical member 1 utilizing a corresponding pair of second clamp members or blocks 34, each of which is connected to the first clamp member 33 of the clamp by a hinge pin 35 on a first side of each of the clamp members 33 and 34. Second clamp member 34 also includes a V-block 36 providing a second clamping surface 34a, which is again preferably V-shaped with an included angle at least generally concave and preferably identical to the first surface 33a. Block 36 is preferably secured to the second member 34 utilizing a press fit dowel pin 37, which pivotally couples and allows V block 36 to rotate on second clamp member 34.

The hinge pin 35 is preferably rigidly secured to the first member 33 preferably utilizing a press fit dowel pin 38. The hinge pin 35 is preferably rigidly secured to the second member 34 also preferably utilizing a dowel pin 38 but in a manner such that the hinge pin 35 can pivot or rotate on the pin 38 in the second member 34. This rotational effect of pin 35 in each clamp allows the clamping surfaces 33a and 34a of each clamp 30 to be pivoted or rotated towards or away from one another and the entire assembly to be able to open and close around the cylindrical member 1 for removably, fixedly securing the sensor device 2 to the member 1. Preferably the clamp 30 is generally circular in configuration, as indicated by broken line 30 so that they may be wrapped around a cylindrical member 1 within a confined area.

The clamping action and clamping force needed to fixedly secure each clamp 30 to the member 1 preferably is achieved by the compressive force generated by a compressive member in the form of a standard threaded bolt 39, which is mounted on the opposite side of the clamp 30 from. hinge pin 35. Threaded bolt 39, screws and other similarly threaded releasable fasteners provide continually varying degrees of adjustment of the second sides of the members 33 and 34 with respect to one another for selectively continually varying the degree of compressive force applied by the clamps to the outer surface of cylindrical member 1. Clamping force is controlled by the amount of torque placed on each threaded bolt 39. The action of rotating each V block 36 in each second member 34 allows the clamping forces to be evenly distributed in each clamp 30 and on member 1 even when accounting for tolerances in the sensor clamping components or the cylindrical member 1.

Preferably clamping surfaces 33a are reduced to the greatest degree permissible in the axial direction to more clearly locate and limit the axial contact of the clamp 30 with the cylinder 1 at the sensor 4. Reducing surface areas 33a in comparison with areas 34a also increases the pressure on the cylinder 1 under members 33 relative to the pressure under members 34, making the cylinder 1 less likely to slip on those surfaces 33a.

Referring to FIG. 3, floating spacers can be provided in larger embodiments of the device 2. One or both of the clamps 30 are provided with one or more pins 31 projecting axially from the second clamp member 34 to be slidably received in bores 31a (phantom) provided in each opposing second clamp member 34 to receive the pins 31. Pins 31 keep the clamps 30 generally concentrically aligned, particularly when the device 2 is not secured to a member 1. This reduces the twisting on sensor 4, particularly in larger embodiments of device 2.

The modular design of sensor device 2 permits a standard sensor 4 to be used with various mounting means 3. Clamps 30 also permit the custom fabrication of devices 2. By the use of clamp members 33 and 34 with hinge pins 35 and bolts 39 of different lengths, cylindrical members of various diameters can be accommodated. For example, commonly sized members 33/34 might be used to accommodate cylindrical members over a half inch range of diameters with four sets of hinge pins 35, which vary successively about 1/8th inch in length. Other considerations for designing clamps and clamping sensors attached to cylindrical members and suitable equipment are disclosed in U.S. Pat. No. 4,911,004, which is incorporated by reference herein in its entirety.

Referring to FIG. 4, one mounting member or block 130 of an alternative mounting means 3 contains a pair of generally concave mounting surfaces 133a and 134a on the ends of connected radial sections 133, 134, which surfaces match the radius of the outer surface of cylindrical member 1 and which are used as bonding surfaces to secure the mounting members 130 to the cylindrical member 1 by a suitable adhesive indicated at 140.

Fastening means are provided in each of the two mounting members 130 such that the sensor means 4 can be rigidly secured to the mounting members 130. Preferably the fastening means consists of a separate pair of screws 132 through each member 130. Means are provided in each member 130 to remove the member 130 from the member 1 and preferably comprise an internally threaded hole 137 through the mounting member 130 and through which a set screw 136 or similar threaded device can be inserted and turned, causing the screw to move forward and contact the cylindrical member 1. Further turning of the set screw 136 will cause it to generate a separating force between the mounting member 130 and the cylindrical member 1, breaking the adhesive 140. Member 130 and its surfaces 133a and 134a collectively cover an arc of less than 180° on member I and thus must be attached to member 1 by means other than clamping.

The sensor 4 is positioned for sensing movement of the mounting means 3 resulting from the rotational deformations in the portion of the cylindrical member 1 under torsional load. Referring now to FIG. 5, the sensor 4 preferably comprises an I-shaped strain member 6 with a relatively long, thin center beam 7 flanked by opposing perpendicular end or cross beams 8 and 9, and four individual axial/longitudinal strain gauges 10, 11, 12, and 13. Strain gauges 10, 11, 12, and 13 are preferably mounted in pairs on opposing sides of the thin center beam 7, near the longitudinal ends of the beam 7 and its junctions with cross beams 8 and 9. The strain gauges 10, 11, 12, and 13 are electrically coupled together in a conventional balance bridge circuit to sense bending in the center beam 7 caused by the relative movement of the mounting members with respect to one another. A cable 20 is preferably connected to the strain gauges through insulated lead wires 20a, 20b, 20c, 20d, extending from the cable 20 to solder joints on a terminal strip 21. The terminal strip 21 preferably is adhesively secured to a terminal mounting bracket or "board" 22, which is preferably fastened to the strain member 6 by suitable means such as mounting screws 131. A cable clamp 23 is preferably secured to the terminal board 22 by suitable means such as two screws 24 to serve as a means for strain relief in the cable 20. Individual leads (not depicted for clarity) are extended from the connections of each of the lead wires 20a–20d and solder joints to separate ones of the strain gauges 10–13, respectively.

After the strain member 6, terminal board 22 and cable 20 have been secured together, the entire resulting assembly is preferably encapsulated with a flexible, stretchable material, such as a room temperature vulcanizing ("RTV") silicone rubber, to provide environmental and mechanical protection to the various strain gauges 10–13. The rubber material provides the required protection without appreciably altering a spring constant of the sensor 4. The encapsulated sensor 4 is preferably releasably but immovably secured to the mounting means 3, via four mounting screws 32, a pair of which are extended into each of the clamps 30 or mounting blocks 130 to complete the device 2.

A conventional strain gauge conditioner 40 can be used to apply excitation signals across one pair of opposing junctions of the balance bridge and to remove signals from a remaining pair of opposing junctions of the balanced bridge on center beam 7 and output a scaled signal proportional to sensed movements of the mounting members 30 or 130 with respect to one another and thus the torsional strain which the cylindrical member 1 has undergone. More specifically, the removed signals are related to the bending movement of the center beam 7 of the strain member 6, which are induced by the rotational deformations of the cylindrical member 1 and which are transmitted to the strain member 6 through the mounting means 3. The output signal from the conditioner 40 can be passed on, for example, to the computer means 5.

FIG. 6 depicts diagrammatically typical double bend deformation of the thin center beam 7 under torsional loading of member 1. For the relative rotations of the members 30 or 130 in the directions 8' and 9' for example, strain gauges 10 and 13 are placed in tension while gauges 11 and 12 are placed in compression. Prior to the imposition of a torsional load on cylindrical member 1 across the mounting members 30/130 of the mounting means 3, center beam 7 is preferably aligned parallel with a central axis 1' of the cylindrical member 1 on which the device 2 is mounted.

Another application of the present invention would be to measure torque on a valve stem or other cylindrical member upon which there may also be a tensile or compressive component of force along the central axis. The sensor device would measure torque just as described in the preferred embodiment but would have to be insensitive to the axial force. Theoretically, the layout of the strain gauges as described would create a cancelling effect for any axial force since each gauge would experience the same amount of compressive or tensile strain. However the forces required to stretch the center beam of the strain member axially are much greater than those required to cause the bending of the center beam from which the sensitivity to torque is derived. These larger forces could be responsible for uneven slippage of the mounting members and could also or alternatively cause some non-cancelling effects with the strain gauges.

Figure 7:
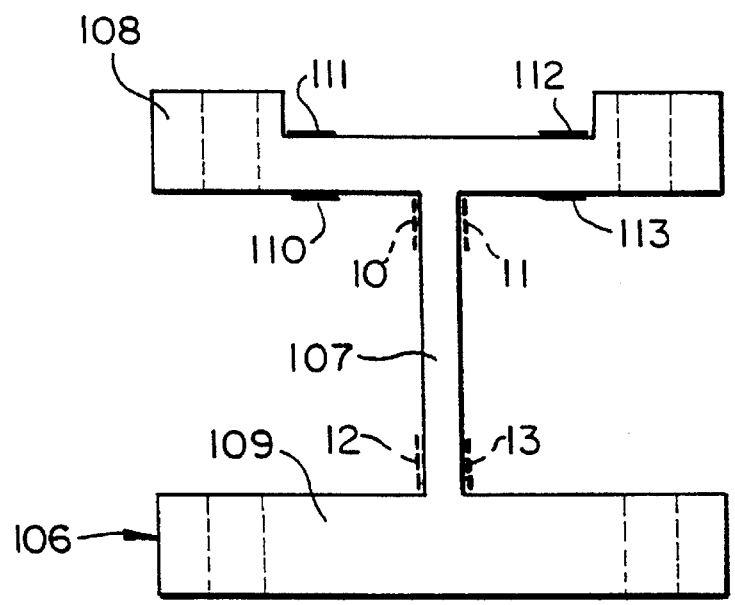
FIG. 7 depicts diagrammatically a second embodiment of a strain sensing portion of the present invention indicating another placement of strain gauges in a bridge to sense axial loads on the cylindrical member.

To alleviate this potential problem, a second embodiment strain member 106 is proposed and shown in FIG. 7 having an accommodation to allow low force deflection in the axial direction but to maintain sufficient stiffness in response to torsion for accurate torsional measurement. The accommodation is provided by suitably thinning at least one of the cross beams 108 (or 109) of member 106 sufficiently to allow that beam to bend readily under axial loading of the cylindrical member 1, which is transverse to the beam 108 or 109. In addition, if desired, the thinned cross beam 108 (or 109) can also be supplied with its own strain gauge(s), preferably four gauges 110, 111, 112, 113, also arrayed in a balance bridge configuration. Strain gauges thus applied to the accommodation (thinned beam 108) as a means of measuring just the axial response. In this manner, a sensor 104 has been created with two separate sets of gauges for measuring both torque and thrust simultaneously and independently.

Figure 8:
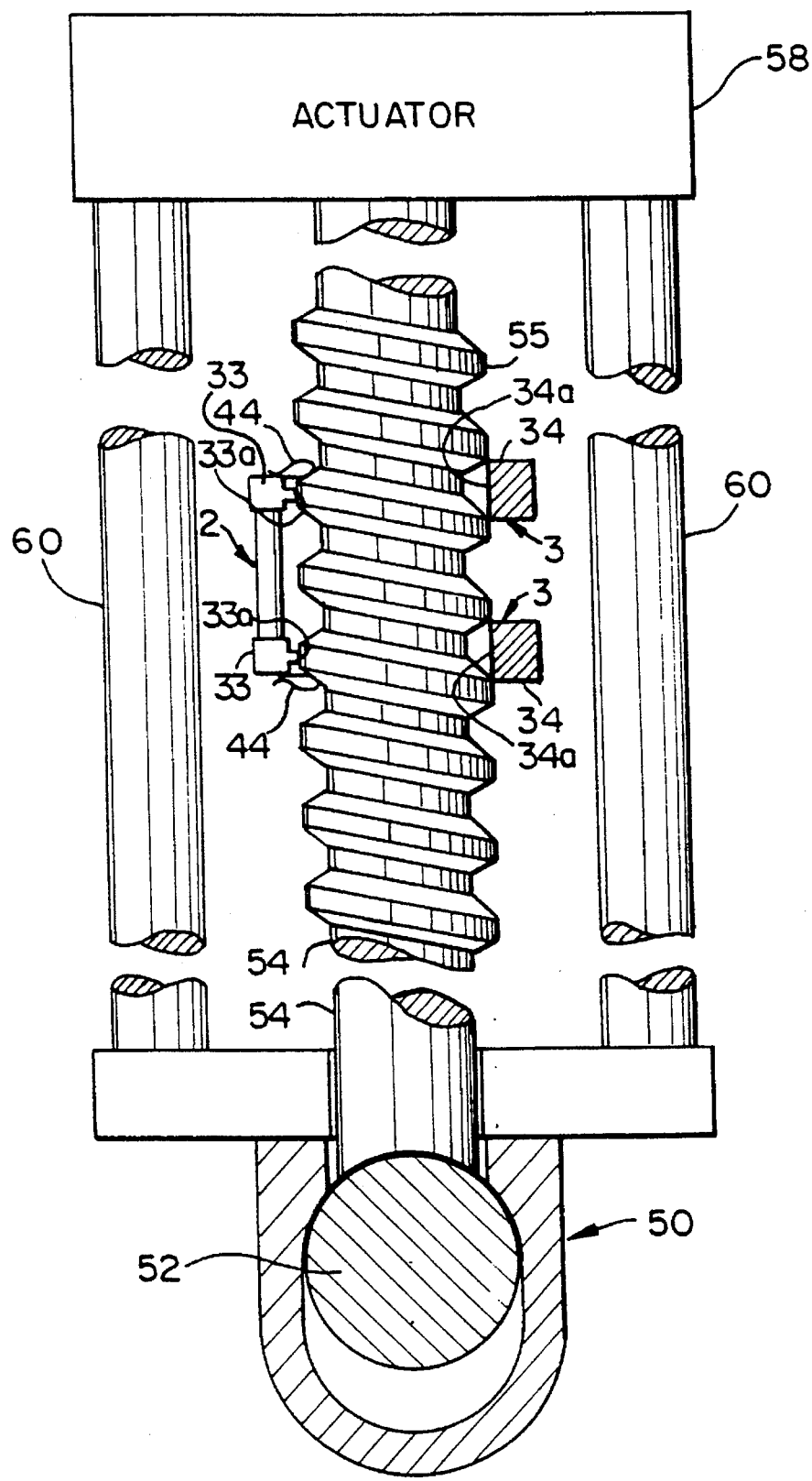
FIG. 8 depicts diagrammatically a modification and the mounting of an embodiment of the sensor device of the present invention mounted to a threaded cylindrical member in the form of a stem of a motor operated valve.

A sensor of this type would be particularly useful on the threaded shaft of a rising stem valve, which typically has components of torque and thrust. Such a valve is depicted in FIG. 8 with a sensor device 2 and explained in greater detail in U.S. Pat. No. 4,805,451, which is incorporated by reference in its entirety. The valve includes a valve housing 50, containing a movable valve member 52 coupled with one end of cylindrical valve stem 54 with threads 55. An actuator 58 is coupled with a remaining end of stem 54. A yoke 60 extends partially around the valve stem 54 and fixedly couples the valve housing 50 and actuator 58. The device 2 is mounted on a portion of the stem exposed through the yoke. In order to use the sensor 4 or 104 on such a cylindrical member, the design of sensor device 2 should account for the helical nature of the threads of the stem and the possibility that the two mounting members could secure differently and possibly unstably to the threaded stem. Such threads are generally provided in integer numbers of threads per inch. This possibility of unsuitable mounting can be minimized by centering each of the two mounting members on a thread major diameter. In general, considering standard threads and a mounting member centerline to centerline spacing of exactly one inch, or an integer multiple of one inch, it is possible to achieve a centered mounting since the number of threads would always divide equally into the one inch dimension. It may be necessary or desirable to reduce the axial length of the clamp surfaces 33a, as is indicated diagrammatically in FIG. 8 and/or necessary or desirable to axially enlarge the clamping surface 34a on clamps 30, which is not specifically indicated, to span the peaks of adjoining threads 55 if the center lines of clamping surfaces 33a are spaced an integer multiple of one inch apart. Also, the addition of compliant spring members 44 to the outside edges of the two clamp members 33, mounting blocks 130 or other mounting members, as shown in FIG. 8, would assure that the mounting members are centered on the individual threads 55 of a threaded stem 54 by reacting against corners of the mounted threads and centering both mounting blocks on the threads.

The strain member 6 and mounting members 30/30 of the present application can be made from any of a variety of materials including, but not limited to, steel, titanium, beryllium copper and other alloys. The selected material should have high strength, be generally resistant to corrosion in the environment in which it will be used, be resiliently flexible and machineable or otherwise workable. For example, success has been had machining the strain members 6 from 17-4 PH stainless steel with H 900 temper as well as with beryllium copper. The components of clamp 30 and of mounting block 130 may also be made of the same materials. Suggested dimensions for the beam 7 might be, for example, 0.050 inches wide×0.225 inches thick×0.580 inches long. Dimensions of the cross beam 108, might be, 0.060 inches wide (reduced from 0.16)×0.225 inches thick× 0.50 inches long. Clamping surfaces 33a and 130a should be as narrow as feasible in an axial direction (parallel to the apex of the surface V). Clamping surfaces 33a in FIG. 8 are less than ¼ inch in axial length, suggestedly less than ¹⁄₁₀th inch and preferably only about 0.090 inch or less in axial length. Clamping surfaces 34a, on the other hand, are suggestedly as long as possible in an axial direction, particularly to permit their mounting on threaded cylindrical members where it may be necessary for the surfaces to span the peaks of adjoining threads. Surfaces 34a in FIG. 8 are suggestedly more than ¼ inch in length and suggestedly more than ⁴⁄₁₀ths of an inch in length so as to be able to span adjacent threads of threaded cylindrical members having at least two threads per inch. It should be appreciated that clamping surfaces 33a and 34a might also be made of a softer material, for example brass or other soft alloy, in order to better grip a particular cylindrical member 1.

Strain gauges 10–13 and 110–113 may be suitable, commercially available devices such as Micro Measurements Catalog No. N2A-06-T012R-350 strain gauges of Measurements Group, Inc., Raleigh, N.C. The terminals may be, for example, Micro Measurements Catalog No. CPF-50C. The signal conditioner 40 may be any of a variety of devices such as a Vishay 2100 Series table model conditioners or P3500 portable conditioners. The room temperature vulcanizing rubber used to encase the sensor 4 might be, for example a General Electric RTV 60, room temperature vulcanizing silicone rubber with a 910 activator. The adhesive 140 used to bond the mounting blocks 130 to a cylindrical member 1 might be, for example, a Loctite 499 cyanoacrylate ester adhesive. The computer means 5 may be any of a variety of programmable personal computers or may be a dedicated microprocessor preprogrammed in firmware specifically to perform this task. Also, U.S. Pat. No. 5,197,338 for SYSTEM AND METHOD FOR DETERMINING TORQUE OUTPUT OF MOTOR ACTUATED VALVE OPERATORS is incorporated by reference herein for its disclosures with respect to torque measurements of stem members.

Figure 9:
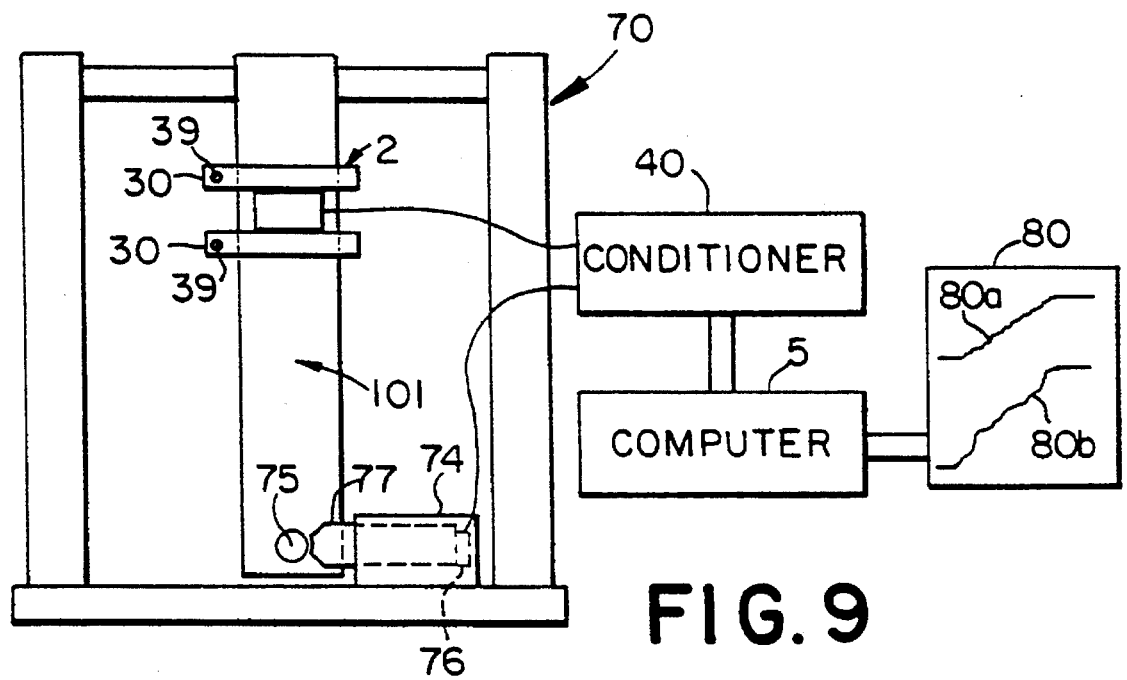
FIG. 9 depicts diagrammatically, a test fixture for calibrating the sensor device.

Prior to use, sensor device 2 of the present invention is preferably calibrated by mounting in a known, predetermined manner to a test cylindrical member of known composition and geometry and which is subjected to pure torsional loading. A calibration fixture 70 is shown diagrammatically in FIG. 9. A device 2 of the present invention is mounted on a cylinder 101 of known composition and geometry. Preferably, clamp members 30 are clamped onto the test member 101 with a predetermined clamping load which is achieved by torquing the tightening bolts 39 to predetermined torques. The strain gauges of sensor device 2 are coupled with a suitable signal conditioner 40 which, in turn, is coupled with a suitable, preferably preprogrammed computer 5. A known pure torsional load supplied to the test cylinder 101 by means of an actuator 74, which applies a tangential force to a bar 75 extending radially from the test cylinder 101, at a predetermined distance from the test cylinder 101. Force is determined by a load cell 76 on the operating member 77 of the actuator 74. Preferably, a continuous signal is provided from the load cell 76 through the conditioner 40, if appropriate, to the programmed computer 5 so that continuous outputs from the load cell 6 can be obtained and recorded with continuous outputs from the sensor device 2. Preferably after initial zeroing, the actuator 74 is actuated numerous times and data from the load cell 76 and the sensor device 2 are simultaneously taken, stored and/or displayed as traces 80 and 80 on a suitable display device 80 by the programmed computer 5. The computer 5 in turn takes the known geometry and material characteristics of the test cylinder 101 calculates torque and strain on cylinder 101 and calculates a strain constant for the sensor device 2, which relates output of the strain sensor with the actual torsional load generated in the test cylinder 101 across the mounting means clamps 30 of the device 2. The output of sensor 2 through conditioner 40 is directly proportional to the torsional strain on cylinder 101. Suitable conventional processing techniques such as a least squares fit approximation, is preferably used to determine the strain constant of the sensor device 2.

After the strain constant has been determined, the sensor can be removed from the test fixture and thereafter installed in a similar fashion under the same torque on any other cylindrical member of which the geometry and material compositional are known. These may be known from a manufacturing standard or determined by initially testing the cylindrical member before installation or by testing several replacement cylindrical members to establish a baseline for such cylindrical members of this group. Preferably, the same system comprising the sensor device 2, conditioning device 40 and processor 5 are employed in the field to measure torque loads. There, the processor is suitably programmed to output a determined torque value from the signals outputted by the sensor device 2 using the predetermined strain constants.

While a preferred system and components have been described for sensing torsional strain and measuring torque therefrom, it will be recognized by those skilled in the art that changes could be made from the above-described embodiments of the invention without departing from the broad inventive concepts thereof. For example, clamp members each with a pair of spaced-apart planar clamp surfaces which do not physically intersect one another but which would intersect one another in a V if projected sufficiently far could also be equally used in place of the V-blocks. Such surfaces could form any intersecting angle greater than 0° and less than 180°. It should be understood, therefore, that this invention is not limited to the particular embodiments disclosed, but is intended to cover all modifications which are within the scope and spirit of the invention as defined by the appended claims.

We claim:

1. A system for determining torsional loading on a generally cylindrical member comprising:

mounting means for removable attachment to a portion of a cylindrical member and for moving in response to torsional deformations in the portion of the cylindrical member, the mounting means comprising a set of opposing clamping surfaces, a hinged member coupling together the set of opposing clamping surfaces and a compressive member securing the opposing clamping surfaces to the cylindrical member; and sensor means connected with the mounting means for sensing rotational movement of the mounting means resulting from torsional deformations in the portion of the cylindrical member and for generating signals proportional to the sensed movement;

wherein the sensor means comprises at least one strain gauge mounted to a separate strain member which is rigidly secured to the mounting means;

wherein the strain member is removable and interchangeable among different mounting means and wherein the strain member is one piece and includes at least first and second mutually perpendicularly oriented beams.

2. The system of claim 1 wherein there are three additional strain gauges positioned with the one strain gauge to bend with strain in the strain member, two of the strain gauges under compressive strain and two of the strain gauges under tensile strain, outputs of the strain gauges being generally equal and opposite to each other and electrically coupled together in a strain gauge bridge circuit so as to generate electrical signals proportional to strains in the cylindrical member sensed by the gauges.

3. The system of claim 1 wherein the generally cylindrical member is a generally cylindrical valve stem and further in combination with a motor operated valve assembly comprising, in addition to the valve stem, a valve including a valve housing containing a movable valve member coupled with one end of the valve stem, an actuator coupled with another end of the valve stem, and yoke extending partially around the valve stem coupling the valve housing and the actuator, a portion of the valve stem receiving the clamping means being exposed through the yoke.

4. The system of claim 1 wherein the strain member contains an accommodation for relieving forces in the axial direction.

5. The system of claim 4 wherein the accommodation in the strain member contains four strain gauges which experience bending strain in the accommodation of the strain member, two of the strain gauges under compressive strain and the other two under tensile strain generally equal and opposite to each other in a strain gauge bridge circuit configured to generate electrical signals proportional to axial strains sensed in the cylindrical member.

6. A stem torque sensor device comprising:

first and second removable cylinder clamps, each clamp being generally annular with a central opening to receive a cylindrical member and each clamp having an inner surface positioned to contact a surface portion of a cylindrical member received in the central opening, at least one of the first and second clamps comprising first and second clamp members, each clamp member having at least one corresponding clamping surface and a rotatable coupling between first sides of the first and second clamp members, the rotatable coupling permitting the clamping surfaces of the first and second clamp members to be rotated towards and away from one another in a plane defined by the at least one cylinder clamp when annular, and an adjustable fastener releasably coupling together to a selectable degree, second sides of the first and second clamp members, at least one V-shaped clamping surface of at least one of the first and second clamp members being coupled with a remainder of the one clamp member to rotate with respect to the remainder of the one clamp member; and a torsional sensor fixedly coupled with each of the first and second clamps between the first and second clamps, spacing the first and second clamps apart from one another in an axial direction of the device with the clamping surfaces of the first and second clamps at least generally coincident in the axial direction so as to permit the surfaces to be applied simultaneously to an outer surface portion of the cylindrical member, the torsional sensor being oriented between the clamps so as to respond to relative rotational movements of the clamps with respect to one another about a central axis of any cylindrical member simultaneously received in the central opening of each of the first and second clamps and fixedly coupled with the clamps from torsional deformation of such cylindrical member between the first and second clamps.

7. The device of claim 6 wherein the torsional sensor includes a strain member fixedly secured with each of the first and second clamps, the strain member including at least first and second perpendicularly oriented beams, the first beam extending in a direction generally parallel to a central axis of any cylindrical member on which the first and second clamps are mounted and the second beam extending in a direction generally perpendicular to the direction of the first beam; and a first plurality of strain gauges mounted to the first beam in an orientation to respond to bending of the first beam from relative rotational movement of the first and second clamps with respect to one another.

8. The device of claim 7 further comprising:

a second plurality of strain gauges mounted to the second beam in an orientation to respond to bending of the second beam from relative axial movement between the first and second clamps with respect to one another.

9. The device of claim 6 further comprising a compliant spring means for reacting against a corner of one thread of a threaded cylindrical member when the first and second clamps are fixedly attached to lobes of the threaded cylindrical member with the torsional sensor being oriented between the first and second clamps so as to respond to slight torsional movements of the clamps with respect to one another.

* * * * *